US012768589B2

(12) United States Patent
Zhao et al.

(10) Patent No.: US 12,768,589 B2
(45) Date of Patent: Oct. 20, 2026

(54) HEATING METHOD, AND REFRIGERATING AND FREEZING APPARATUS

(71) Applicants: QINGDAO HAIER REFRIGERATOR CO., LTD., Qingdao (CN); HAIER SMART HOME CO., LTD., Qingdao (CN)

(72) Inventors: Yanfeng Zhao, Qingdao (CN); Xiaobing Zhu, Qingdao (CN); Chunyang Li, Qingdao (CN); Ming Wang, Qingdao (CN); Zhiqiang Han, Qingdao (CN); Jinghai Al, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 147 days.

(21) Appl. No.: 18/580,209

(22) PCT Filed: Apr. 24, 2022

(86) PCT No.: PCT/CN2022/088793
§ 371 (c)(1),
(2) Date: Jan. 18, 2024

(87) PCT Pub. No.: WO2023/005289
PCT Pub. Date: Feb. 2, 2023

(65) Prior Publication Data

US 2024/0318903 A1 Sep. 26, 2024

(30) Foreign Application Priority Data

Jul. 28, 2021 (CN) ........................ 202110859060.9

(51) Int. Cl.
*H05B 6/68* (2006.01)
*F25D 31/00* (2006.01)

(52) U.S. Cl.
CPC ............ *F25D 31/005* (2013.01); *H05B 6/68* (2013.01)

(58) Field of Classification Search
CPC . B21D 53/14; F16G 5/16; F16G 5/163; F16G 3/08; A01F 11/06; A01F 15/18;
(Continued)

(56) References Cited

U.S. PATENT DOCUMENTS

| | | | |
|---|---|---|---|
| 2015/0118368 A1 | 4/2015 | Lin | |
| 2019/0191500 A1 | 6/2019 | Mongin et al. | |
| 2020/0084844 A1 | 3/2020 | Qiu et al. | |

FOREIGN PATENT DOCUMENTS

| | | |
|---|---|---|
| CN | 101940351 A | 1/2011 |
| CN | 108076552 A | 5/2018 |

(Continued)

OTHER PUBLICATIONS

Chinese Intellectual Property Office (ISR/CN), "International Search Report for PCT/CN2022/088793", China, Jul. 18, 2022.

(Continued)

*Primary Examiner* — Quang T Van
(74) *Attorney, Agent, or Firm* — troutman pepper locke; Tim Tingkang Xia, Esq.

(57) ABSTRACT

Provided are a heating method and a refrigerating and freezing apparatus (200) having a heating unit (100). The heating method includes: controlling a heating unit (100) to operate to heat an object to be processed (150); if a heating suspension condition is met, recording a current heating parameter of the heating unit (100), and controlling the heating unit (100) to stop operating; and if a heating continuation condition is met, controlling the heating unit (100)

(Continued)

to continue operating according to the recorded heating parameter. By recording the most recent heating parameter before the heating unit (100) stops heating, heating continues according to the recorded heating parameter after heating is resumed, thereby simplifying a control process, preventing a re-determined heating parameter from causing an object to be processed (150) to be excessively heated, shortening a heating time, and reducing unnecessary energy consumption.

10 Claims, 6 Drawing Sheets

(58) Field of Classification Search
CPC . A01F 2015/183; C03C 25/18; C03C 25/106; A01B 15/08; A01C 7/02; A01C 7/06; A01C 9/00; A01D 2101/00; A01D 34/06; A01D 34/13; A01D 34/14; A01D 34/408; A01D 34/435; A01D 45/02; A01G 3/0426; A01K 13/002; A23B 2/82; A23N 15/02; A24F 15/04; A43B 7/125; A47G 25/82; B01F 27/1153; B01F 27/70; B02C 13/20; B02C 2/10; B07B 1/24; B21B 27/035; B21C 23/212; B23B 35/005; B23D 49/007; B25H 1/0064; B26D 3/18; B27F 1/10; B27L 7/00; B29C 35/16; B29C 48/05; B29C 48/325; B61F 15/18; B61F 17/22; B62D 33/0273; B63B 7/06; B65D 39/06; D01B 1/06; D05B 57/02; D06F 11/00; D06F 3/00; D06F 3/02; E03B 9/14; E04B 9/068; E04D 3/366; E05B 45/02; F04B 17/00; F04B 3/00; F23D 99/004; F25D 31/005; F27B 1/08; F41A 19/53; F41C 9/04; G10C 3/12; H03B 5/30; H05B 6/50; H05B 6/62; H05B 6/68; H05K 3/3405; Y10S 118/11; Y10S 118/13; Y10S 118/18; Y10S 428/904; Y10T 137/538; Y10T 24/1684; Y10T 29/29; Y10T 29/49547; Y10T 29/49552; Y10T 408/5623; Y10T 83/5851; Y10T 83/7055; B05D 7/20; C08K 5/0025; C08L 21/00
USPC ....... 219/702, 678, 704, 710, 715, 716, 721, 219/722, 764, 770, 778, 779, 780
See application file for complete search history.

(56) References Cited

FOREIGN PATENT DOCUMENTS

| | | | | | |
|---|---|---|---|---|---|
| CN | 108153182 | A | | 6/2018 | |
| CN | 109000419 | A | | 12/2018 | |
| CN | 109845949 | A | | 6/2019 | |
| CN | 209893782 | U | | 1/2020 | |
| CN | 112799446 | A | | 5/2021 | |
| EP | 3500066 | A1 | * | 6/2019 | H05B 6/664 |
| JP | H1123987 | A | | 1/1999 | |
| JP | 2004340471 | A | | 12/2004 | |
| JP | 2013167422 | A | | 8/2013 | |
| JP | 2018081908 | A | | 5/2018 | |
| JP | 2019110112 | A | | 7/2019 | |
| KR | 20130034041 | A | * | 4/2013 | H05B 6/688 |

OTHER PUBLICATIONS

JPO, "Office Action for JP Application No. 2024-504217", Japan.
EPO, "Supplementary European Search Report for EP Application No. 22847907.7", Munich, Germany, Aug. 2, 2024.

* cited by examiner

HEATING METHOD, AND REFRIGERATING AND FREEZING APPARATUS

CROSS-REFERENCE TO RELATED PATENT APPLICATION

This application is a U.S. national stage application of PCT Patent Application No. PCT/CN2022/088793 filed Apr. 24, 2022, which claims priority to and the benefit of Chinese Application No. 202110859060.9 filed Jul. 28, 2021, which are incorporated herein in their entireties by reference.

FIELD OF THE INVENTION

The present invention relates to the technical field of food processing, and more particularly relates to a heating method and a refrigerating and freezing apparatus having a heating unit.

BACKGROUND OF THE INVENTION

During the freezing process of food, the quality of food is maintained, but frozen food needs to be thawed before processing or consumption. In order to facilitate a user thawing food, electromagnetic wave heating units are usually used to thaw the food.

Thawing food with electromagnetic wave heating units is not only fast and efficient, but also reduces the loss of nutrients in the food. However, in the prior art, thawing is generally performed based on heating parameters input by a user, or heating parameters are automatically confirmed for thawing according to the food parameters (weight, temperature, size, etc.) detected by a detection device, which either places too high requirements on the user, or increases the production cost of a heating unit, cannot realize precise thawing of food, and leads to the poor quality of the thawed food and even the need for multiple thawing. Considered comprehensively, it is necessary in design to provide a heating method that can achieve precise heating of an object to be processed and prevents the same from being overheated, and a refrigerating and freezing apparatus having a heating unit.

BRIEF DESCRIPTION OF THE INVENTION

An object of a first aspect of the present invention is to provide a heating method to overcome at least one of the technical defects in the prior art.

A further object of the first aspect of the present invention is to prevent an object to be processed from being overheated.

Another further object of the first aspect of the present invention is to reduce energy consumption.

An object of a second aspect of the present invention to provide a refrigerating and freezing apparatus having a heating unit.

According to the first aspect of the present invention, provided is a heating method, including:

- controlling a heating unit to operate to heat an object to be processed;
- if a heating suspension condition is met, recording a current heating parameter of the heating unit, and controlling the heating unit to stop operating; and
- if a heating continuation condition is met, controlling the heating unit to continue operating according to the recorded heating parameter.

Optionally, the heating unit includes an electromagnetic wave generation module for generating an electromagnetic wave signal, a cavity capacitor for accommodating the object to be processed, and an impedance matching module connected in series between the electromagnetic wave generation module and the cavity capacitor or in parallel at both ends of the cavity capacitor; prior to the step of controlling the heating unit to operate, the heating method further includes:

- adjusting the configuration of the impedance matching module to reduce a reflected wave power returning to the electromagnetic wave generation module; and
- determining an initial heating parameter of the heating unit based on the configuration of the impedance matching module, where
- the initial heating parameter includes at least one of heating power, and a termination threshold for terminating a heating procedure.

Optionally, the heating unit includes the electromagnetic wave generation module for generating the electromagnetic wave signal, and the cavity capacitor which is electrically connected to the electromagnetic wave generation module and used for accommodating the object to be processed; prior to the step of controlling the heating unit to operate, the heating method further includes:

- adjusting the frequency of the electromagnetic wave signal to reduce the reflected wave power returning to the electromagnetic wave generation module; and
- determining the initial heating parameter of the heating unit based on the frequency of the electromagnetic wave signal, where
- the initial heating parameter include at least one of the heating power, and the termination threshold for terminating the heating procedure.

Optionally, the heating unit is arranged in a storage compartment of a refrigerating and freezing apparatus,

- a heating suspension condition includes that a door corresponding to the storage compartment is opened, and
- a heating continuation condition includes that the door corresponding to the storage compartment is closed, and a door body of the heating unit does not open or close during the opening and closing of the door.

Optionally, the heating method further includes:

- if the door body of the heating unit opens or closes after the heating unit suspends heating, controlling the heating unit to terminate the heating procedure.

Optionally, the heating unit is arranged in the storage compartment of the refrigerating and freezing apparatus, and a door of the refrigerating and freezing apparatus is provided with an interactive unit; prior to the step of controlling the heating unit to operate, the heating method further includes:

- if the door body of the heating unit opens or closes during an opening and closing process of the door corresponding to the storage compartment, activating the interactive unit after the door corresponding to the storage compartment is closed, so as to receive a heating command.

Optionally, the heating unit is arranged in the storage compartment of the refrigerating and freezing apparatus, and prior to the step of controlling the heating unit to operate, the heating method further includes:

- if the door corresponding to the storage compartment is opened, supplying power to the heating unit; and
- if no heating instruction is received within a preset standby time from the time when the door corresponding to the storage compartment is closed, stopping supplying power to the heating unit.

Optionally, prior to the step of controlling the heating unit to operate, the heating method further includes:

if a heating completion condition is met, controlling the heating unit to terminate the heating procedure; and if the object to be processed is taken out, receiving another heating command again.

Optionally, if the door body of the heating unit is opened, determining that the object to be processed is taken out; and/or after a preset interval time passes since the heating completion condition is met, executing the step of if the object to be processed is taken out, receiving another heating command again.

According to the second aspect of the present invention, provided is a refrigerating and freezing apparatus, including:

a box body, in which at least one storage compartment is defined;

at least one door, configured to open and close the at least one storage compartment;

a heating unit, configured to heat an object to be processed; and a controller, configured to execute any of the above the heating method.

The inventors of the present application creatively realize that during the heating process of food, food parameters such as temperature difference between the inside and outside of the food, shape and size of the food, and dielectric properties of the food will all change. If the heating parameters are re-determined by the same method as the initial heating after heating is stopped, a great error may be caused, resulting in excessive heating of the food. According to the present invention, by recording the most recent heating parameter before the heating unit stops heating, and continuing to perform heating according to the recorded heating parameter after heating is resumed, a control process is simplified, and the phenomenon that the object to be processed is overheated according to the re-determined heating parameters is avoided, so that the heating time is shortened, and unnecessary energy consumption is reduced.

Further, the present invention determines the initial heating parameter of the heating unit based on the configuration of the impedance matching module or the frequency of the electromagnetic wave signal. Compared with directly measuring the food parameters of the object to be processed, the present invention saves the cost of additional arrangement of a measuring device, tolerates the errors of the measurement device, obtains feature parameters with higher accuracy, and thus achieves excellent heating effects.

Further, by determining the opening and closing of the door of the refrigerating and freezing apparatus and/or the door body of the heating unit, the present invention supplies power to the heating unit, activates the interactive unit, and suspends or terminates the thawing procedure; thus, not only does it not require additional arrangement of a sensing device, which reduces the production cost and energy consumption of the refrigerating and freezing apparatus on the whole, but electromagnetic wave leakage can also be effectively reduced or even avoided, thereby eliminating adverse effects on user health, and improving user experience.

According to the detailed description of specific examples of the present invention below in conjunction with the accompanying drawings, those skilled in the art will more clearly understand the foregoing and other objects, advantages, and features of the present invention.

BRIEF DESCRIPTION OF THE DRAWINGS

Hereinafter, some specific examples of the present invention will be described in detail in an exemplary and non-limiting manner with reference to the accompanying drawings. The same reference numbers in the drawings indicate the same or similar components or parts. Those skilled in the art will appreciate that these drawings are not necessarily drawn to scale. In the drawings.

DETAILED DESCRIPTION

Figure 1:
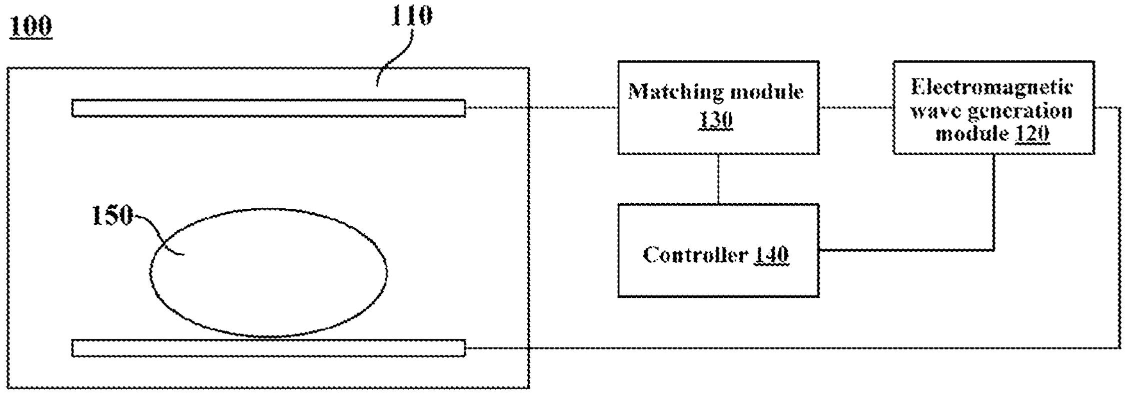
FIG. 1 is a schematic structural diagram of a heating unit according to an embodiment of the present invention.

FIG. 1 is a schematic structural diagram of a heating unit 100 according to an embodiment of the present invention. Referring to FIG. 1, the heating unit 100 may include a cavity capacitor 110, an electromagnetic wave generation module 120, and a controller 140.

Specifically, the cavity capacitor 110 may include a cavity 111 for accommodating an object 150 to be processed, and a radiation electrode plate disposed in the cavity 111. In some embodiments, a receiving electrode plate may also be disposed in the cavity 111 to form a capacitor with the radiation electrode plate. In some other embodiments, the cavity 111 may be made of metal to serve as a receiving electrode plate for formation of a capacitor together with the radiation electrode plate.

The cavity capacitor 110 may further include a door body 112 for closing an access opening of the cavity 111 to reduce leakage of electromagnetic waves.

The electromagnetic wave generation module 120 may be configured to generate an electromagnetic wave signal and be electrically connected to the radiation electrode plate of the cavity capacitor 110, so as to generate the electromagnetic waves within the cavity capacitor 110, thereby heating the object 150 to be processed in the cavity capacitor 110.

The controller 140 may include a processing unit and a storage unit, where the storage unit stores a computer program, and the computer program is configured to implement a control method of the embodiment of the present invention when being executed by the processing unit.

In particular, the processing unit may be configured to control the heating unit 100 to operate to heat the object 150 to be processed; when a heating suspension condition is met, a current heating parameter of the heating unit 100 is recorded, and the heating unit 100 is controlled to stop operating; and when a heating continuation condition is met, the heating unit 100 is controlled to continue operating according to the recorded heating parameter.

The inventors of the present application creatively realize that during the heating process of food, food parameters such as temperature difference between the inside and outside of the food, shape and size of the food, and dielectric properties of the food will all change. If the heating parameters are re-determined by the same method as the initial heating after heating is stopped, a great error may be caused, resulting in excessive heating of the food. According to the present invention, the heating unit 100 records the most recent heating parameter before the heating unit 100 stops heating, and heating is continued according to the recorded heating parameter after heating is resumed, which not only simplifies a control process, but also avoids the phenomenon that the object 150 to be processed is overheated according to the re-determined heating parameters, so that the heating time is shortened, and unnecessary energy consumption is reduced.

The initial heating parameter includes at least one of heating power, and a termination threshold for terminating a heating procedure.

The termination threshold may be a total heating time, a change threshold of a dielectric coefficient, and the like. When the heating time of the object 150 to be processed reaches the total heating time and the change rate of the dielectric coefficient of the object 150 to be processed decreases to less than or equal to the change threshold, it is determined that the heating of the object 150 to be processed is completed.

In some embodiments, the heating unit 100 may further include an impedance matching module 130. The impedance matching module 130 may be connected in series between the electromagnetic wave generation module 120 and the cavity capacitor 110 or connected in parallel at both ends of the cavity capacitor 110, and is configured to adjust a load impedance of the electromagnetic wave generation module 120 by adjusting its own impedance, so as to achieve load matching and improve heating efficiency.

The processing unit may be further configured to determine an initial heating parameter according to the configuration of the impedance matching module 130 prior to the step of controlling the heating unit 100 to operate. That is, by adjusting the configuration of the impedance matching module 130, a reflected wave power returning to the electromagnetic wave generation module 120 is reduced; and the initial heating parameter of the heating unit 100 is determined according to the configuration of the impedance matching module 130, so as to reduce sensing devices, and realize precise heating of the object 150 to be processed.

Specifically, after receiving a heating command, the processing unit may control the electromagnetic wave generation module 120 to generate an electromagnetic wave signal with a preset initial power, adjust the configuration of the impedance matching module 130, determine the configuration of the impedance matching module 130 that achieves a minimum reflected wave power returning to the electromagnetic wave generation module 120, and determine the initial heating parameter according to the configuration of the impedance matching module 130 with the minimum reflected wave power.

In the present invention, the preset initial power may be 10-20 W, for example, 10 W, 15 W or 20 W, so as to reduce the impact on the object 150 to be processed, and save energy.

The heating unit 100 may also include a directional coupler connected in series between the cavity capacitor 110 and the electromagnetic wave generation module 120 for monitoring the reflected wave power returning to the electromagnetic wave generation module 120 in real time.

In some further embodiments, the impedance matching module 130 may include multiple matching branches that can be switched on and off independently. The processing unit may be further configured to determine the initial heating parameter according to the on-off combination numbers of the multiple matching branches, so as to shorten the time for determining the initial heating parameter.

The storage unit may store a preset comparison table, which records a corresponding relation between the on-off combination numbers and the initial heating parameters. The processing unit may be configured to match, according to the preset comparison table, the corresponding initial heating parameter based on the on-off combination number that realizes the minimum reflected wave power.

Figure 2:
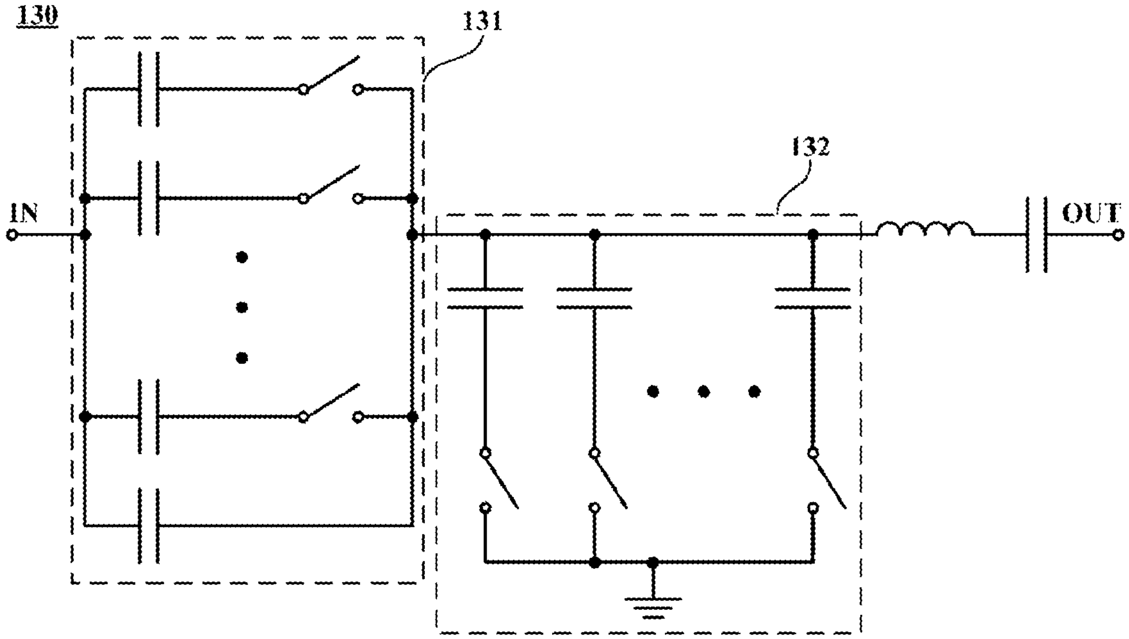
FIG. 2 is a schematic circuit diagram of an impedance matching module in FIG. 1.

FIG. 2 is a schematic circuit diagram of the impedance matching module 130 in FIG. 1. Referring to FIG. 2, the impedance matching module 130 may include a first matching unit 131 connected in series between the electromagnetic wave generation module 120 and the cavity capacitor 110, and a second matching unit 132, one end of which is electrically connected between the first matching unit 131 and the cavity capacitor 110, and the other end thereof is grounded.

The first matching unit 131 and the second matching unit 132 may respectively include a plurality of matching branches connected in parallel, and each of the matching branches includes a fixed capacitor and a switch, so as to improve the reliability and adjustable range of the impedance matching module 130 while simplifying a circuit. The capacitance values of the plurality of fixed capacitors of the first matching unit 131 and the second matching unit 132 may not be equal.

In other embodiments, the electromagnetic wave generation module 120 may include a frequency source, a power amplifier, and a voltage-controlled oscillator for adjusting an output frequency of the frequency source (a frequency of the electromagnetic wave signal).

The processing unit may be further configured to determine the initial heating parameter according to the frequency of the electromagnetic wave signal prior to the step of controlling the heating unit 100 to operate. That is, by adjusting the frequency of the electromagnetic wave signal, the reflected wave power returning to the electromagnetic wave generation module 120 is reduced; and the initial heating parameter of the heating unit 100 is determined according to the frequency of the electromagnetic wave signal, so as to reduce the sensing devices, and realize precise heating of the object 150 to be processed.

Specifically, after receiving a heating command, the processing unit may control the electromagnetic wave generation module 120 to generate an electromagnetic wave signal with a preset initial power, adjust the frequency of the electromagnetic wave signal, determine the frequency of the electromagnetic wave signal that achieves the minimum reflected wave power returning to the electromagnetic wave generation module 120, and determine the initial heating parameter according to the frequency of the electromagnetic wave signal with the minimum reflected wave power.

Figure 3:
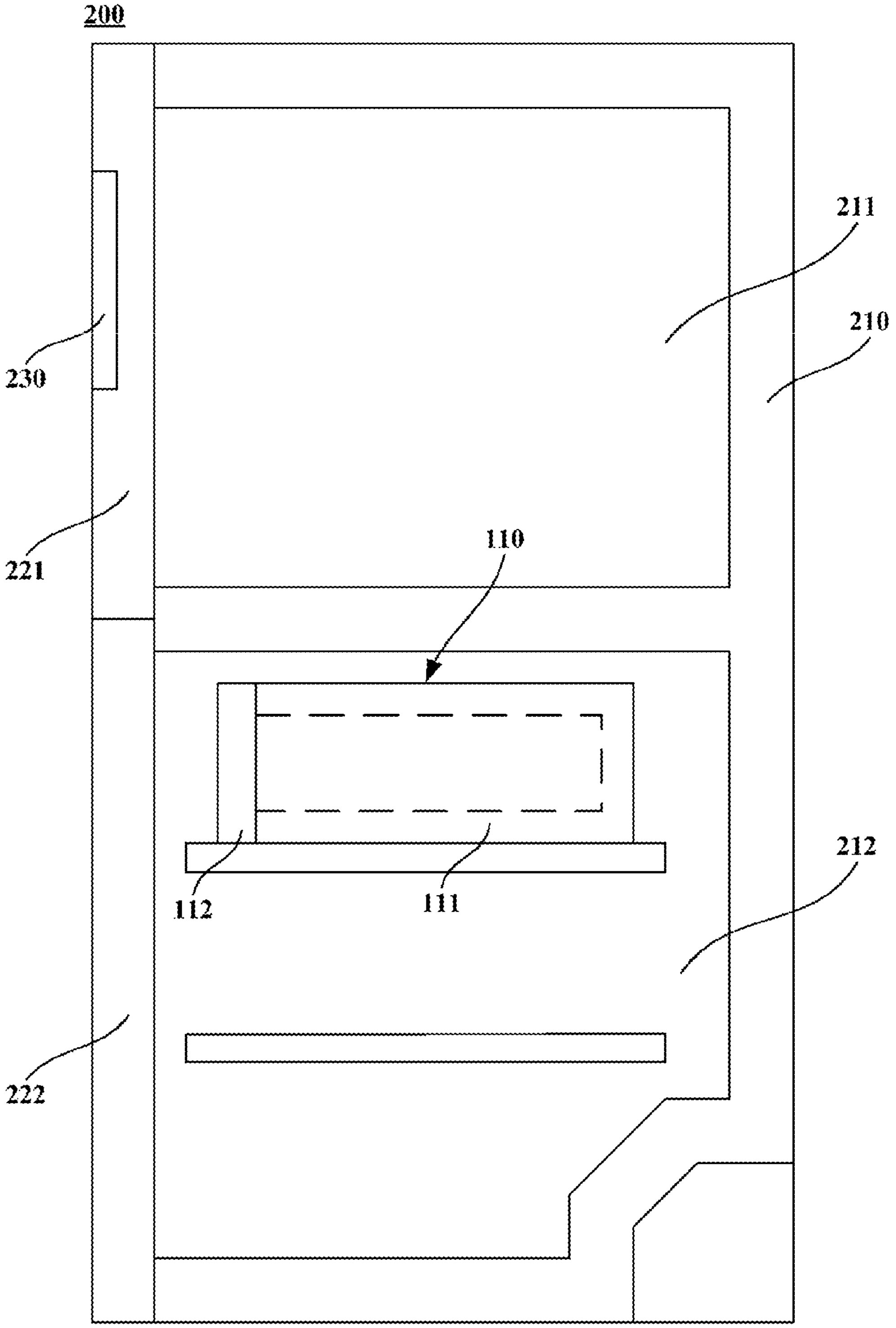
FIG. 3 is a schematic cross-sectional view of a refrigerating and freezing apparatus according to an embodiment of the present invention.

FIG. 3 is a schematic cross-sectional view of a refrigerating and freezing apparatus 200 according to an embodiment of the present invention. Referring to FIG. 3, the present invention also provides a refrigerating and freezing apparatus 200. The refrigerating and freezing apparatus 200 may include a box body 210, in which at least one storage compartment is defined, a door configured to open and close the at least one storage compartment, a refrigeration system that provides cooling capacity to the at least one storage compartment, and a controller 140. In this embodiment, the cavity capacitor 110 of the heating unit 100 may be arranged in a storage compartment; and a part of the controller 140 may be located within the cavity capacitor 110, and is mainly configured to control the operation of the electromagnetic wave generation module 120, the impedance matching module 130, and other devices, and the other part of the controller is located in a compressor compartment or top of the box body 210, and is mainly configured to control the operation of the refrigeration system.

In the illustrated embodiment, the at least one storage compartment may include a refrigerating compartment 211 and a freezing compartment 212 arranged below the refrigerating compartment 211. At least one door may include a refrigerator door 221 for opening and closing the refrigerating compartment 211, and a freezer door 222 for opening and closing the freezing compartment 212. The cavity capacitor 110 may be arranged in the freezing compartment 212 to facilitate a user picking and placing the object 150 to be processed.

The refrigerating and freezing apparatus 200 of the present invention will be described in detail below by taking the arrangement of the cavity capacitor 110 in the freezing compartment 212 as an example.

In some embodiments, the heating suspension condition may include that the freezer door 222 is opened. The heating continuation condition may include that the freezer door 222 is closed, and the door body 112 does not open or close during the opening and closing of the freezer door 222. That is, in a heating process, if the freezer door 222 is opened, the processing unit controls the electromagnetic wave generation module 120 to stop working, so as to reduce or even eliminate the impact of electromagnetic waves on a user; and if the freezer door 222 is closed and the door body 112 does not open or close in this process, the processing unit controls the electromagnetic wave generation module 120 to continue working according to the recorded heating parameter, so as to prevent the object 150 to be processed from being overheated.

The processing unit may be further configured to control the heating unit 100 to terminate the heating procedure if the door body 112 of the heating unit 100 opens or closes after the heating unit 100 suspends heating, that is, to control the electromagnetic wave generation module 120 to stop working, so as to avoid the phenomenon that the electromagnetic wave generation module 120 is damaged due to heating of a cavity when a user takes out the object 150 to be processed.

In some embodiments, the refrigerating and freezing apparatus 200 may also include an interactive unit 230 for receiving a heating command. The interactive unit 230 may be located at one of the doors, e.g., the refrigerator door 221 located on the upper side.

The processing unit may be configured to activate the interactive unit 230 after the freezer door 222 is closed if the door body 112 opens or closes during the opening and closing process of the freezer door 222, and then to receive the heating command, so as to save electric energy and reduce the waiting time of the user.

In some embodiments, in the case where the heating unit 100 is not in a working state, the processing unit may be configured to supply power to the heating unit 100 when the freezer door 222 is opened, so as to save electric energy and quickly start heating.

The heating unit 100 may further include a power supply module configured to receive mains power and supply power to the electromagnetic wave generation module 120 and the electrical devices in the cavity capacitor 110. In the present invention, the supplying power to the heating unit 100 refers to providing electric energy to the power supply module.

The processing unit is further configured to stop supplying power to the heating unit 100 in the case that no heating command is received within a preset standby time from the time when the freezer door 222 is closed, so as to save electric energy.

In some embodiments, during the heating process, the processing unit may be configured to control the heating unit 100 to terminate the heating procedure when a heating completion condition is satisfied, and to receive a heating command again when the object 150 to be processed is taken out, so as to prevent the object 150 to be processed from being repeatedly heated. The heating completion condition may be that the corresponding parameters reach termination thresholds, for example, the heating time of the object 150 to be processed reaches the total heating time, and the change rate of the dielectric coefficient of the object 150 to be processed decreases to less than or equal to the change threshold.

In some further embodiments, the processing unit may be configured to determine that the object 150 to be processed is taken out when the door body 112 is opened, so as to reduce detection devices.

In some further embodiments, the processing unit may be configured to receive a heating command again after a preset interval time passes since the heating completion condition is satisfied, so as to prevent the electromagnetic wave generation module 120 from overheating for a long time and extend the service life of the electromagnetic wave generation module 120.

Figure 4:
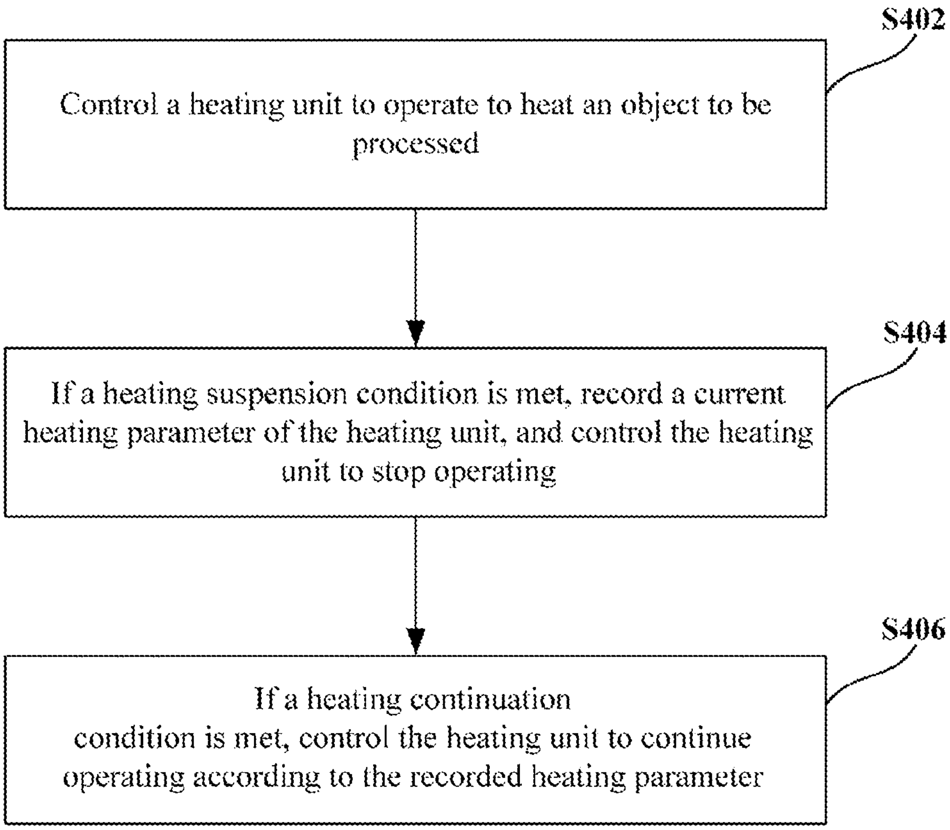
FIG. 4 is a schematic flow chart of a heating method according to an embodiment of the present invention.

FIG. 4 is a schematic flow chart of a heating method according to an embodiment of the present invention. Referring to FIG. 4, the heating method performed by the controller 140 of any of the above-mentioned embodiments of the present invention may include the following steps:

Step S402: controlling a heating unit 100 to operate to heat an object 150 to be processed;

Step S404: if a heating suspension condition is met, recording a current heating parameter of the heating unit 100, and controlling the heating unit 100 to stop operating; and Step S406: if a heating continuation condition is met, controlling the heating unit 100 to continue operating according to the recorded heating parameter.

According to heating method provided by the present invention, by recording the most recent heating parameter before the heating unit 100 stops heating, and continuing to perform heating according to the recorded heating parameter after heating is resumed, a control process is simplified, and the phenomenon that the object 150 to be processed is overheated according to re-determined heating parameter is avoided, so that the heating time is shortened, and unnecessary energy consumption is reduced.

In some embodiments, the heating suspension condition may include that a door corresponding to a cavity capacitor 110 is opened. The heating continuation condition may include that the door corresponding to the cavity capacitor 110 is closed, and a door body 112 does not open or close during the opening and closing of the door. That is, in a heating process, if the door corresponding to the cavity capacitor 110 is opened, the processing unit controls an electromagnetic wave generation module 120 to stop working, so as to reduce or even eliminate the influence of electromagnetic waves on a user; and if the door corresponding to the cavity capacitor 110 is closed and the door body

112 does not open or close during this process, the processing unit controls the electromagnetic wave generation module 120 to continue working according to the recorded heating parameter, so as to avoid the object 150 to be processed being excessively heated.

In some further embodiments, the heating method may also include the following steps:

if the door body 112 opens or closes after the heating unit 100 suspends heating, controlling the heating unit 100 to terminate the heating procedure, so as to avoid the phenomenon that the electromagnetic wave generation module 120 is damaged due to heating of a cavity when a user takes out the object 150 to be processed.

In some embodiments, prior to step S402, the heating method may also include:

if the door body 112 opens and closes during the opening and closing process of the door corresponding to the cavity capacitor 110, activating an interactive unit 230 after the door corresponding to the cavity capacitor 110 is closed, and further receiving a heating command, so as to save electric energy and reduce the waiting time of the user.

In some embodiments, prior to step S402, the heating method may also include:

if the door corresponding to the cavity capacitor 110 is opened, supplying power to the heating unit 100 (i.e., supplying power to a power supply module) to save electric energy and quickly start heating; and if no heating command is received within a preset standby time from the time when the door corresponding to the cavity capacitor 110 is closed, stopping supplying power to the heating unit 100 to save electric energy.

In some embodiments, prior to step S402, the heating method may also include:

adjusting the configuration of an impedance matching module 130 to reduce the reflected wave power returning to the electromagnetic wave generation module 120; and determining an initial heating parameter of the heating unit 100 based on the configuration of the impedance matching module 130, so as to reduce sensing devices, and realize precise heating of the object 150 to be processed, where the initial heating parameter includes at least one of heating power, and a termination threshold for terminating the heating procedure.

In some embodiments, prior to step S402, the heating method may also include:

adjusting the frequency of an electromagnetic wave signal to reduce the reflected wave power returning to the electromagnetic wave generation module 120; and determining the initial heating parameter of the heating unit 100 based on the frequency of the electromagnetic wave signal, so as to reduce sensing devices, and realize precise heating of the object 150 to be processed, where the initial heating parameter includes at least one of heating power, and a termination threshold for terminating the heating procedure.

The termination threshold may be a total heating time, a change threshold of a dielectric coefficient, and the like. When the heating time of the object 150 to be processed reaches the total heating time and the change rate of the dielectric coefficient of the object 150 to be processed decreases to less than or equal to the change threshold, it is determined that the heating of the object 150 to be processed is completed.

In some embodiments, after step S402, the heating method may also include:

if a heating completion condition is met, controlling the heating unit 100 to stop working, (where the heating completion condition may be that the corresponding parameter reaches the termination threshold, for example, the heating time of the object 150 to be processed reaches the total heating time, and the change rate of the dielectric coefficient of the object 150 to be processed decreases to less than or equal to the change threshold); and if the object 150 to be processed is taken out, receiving a heating command again, so as to prevent the object 150 to be processed from being repeatedly heated.

In some further embodiments, the door body 112 of the heating unit 100 is opened, it is determined that the object 150 to be processed is taken out, so as to reduce detection devices.

In some further embodiments, after a preset interval time passes since the heating completion condition is satisfied, the step of if the object 150 to be processed is taken out, receiving a heating command again is performed, so as to prevent the electromagnetic wave generation module 120 from overheating for a long time and extend the service life of the electromagnetic wave generation module 120.

A refrigerating and freezing apparatus 200 provided by the present invention will be described in detail below by taking an example in which the cavity capacitor 110 is arranged in the freezing compartment 212 of the refrigerating and freezing apparatus 200 and the initial heating parameter includes heating power and total heating time.

Figure 5:
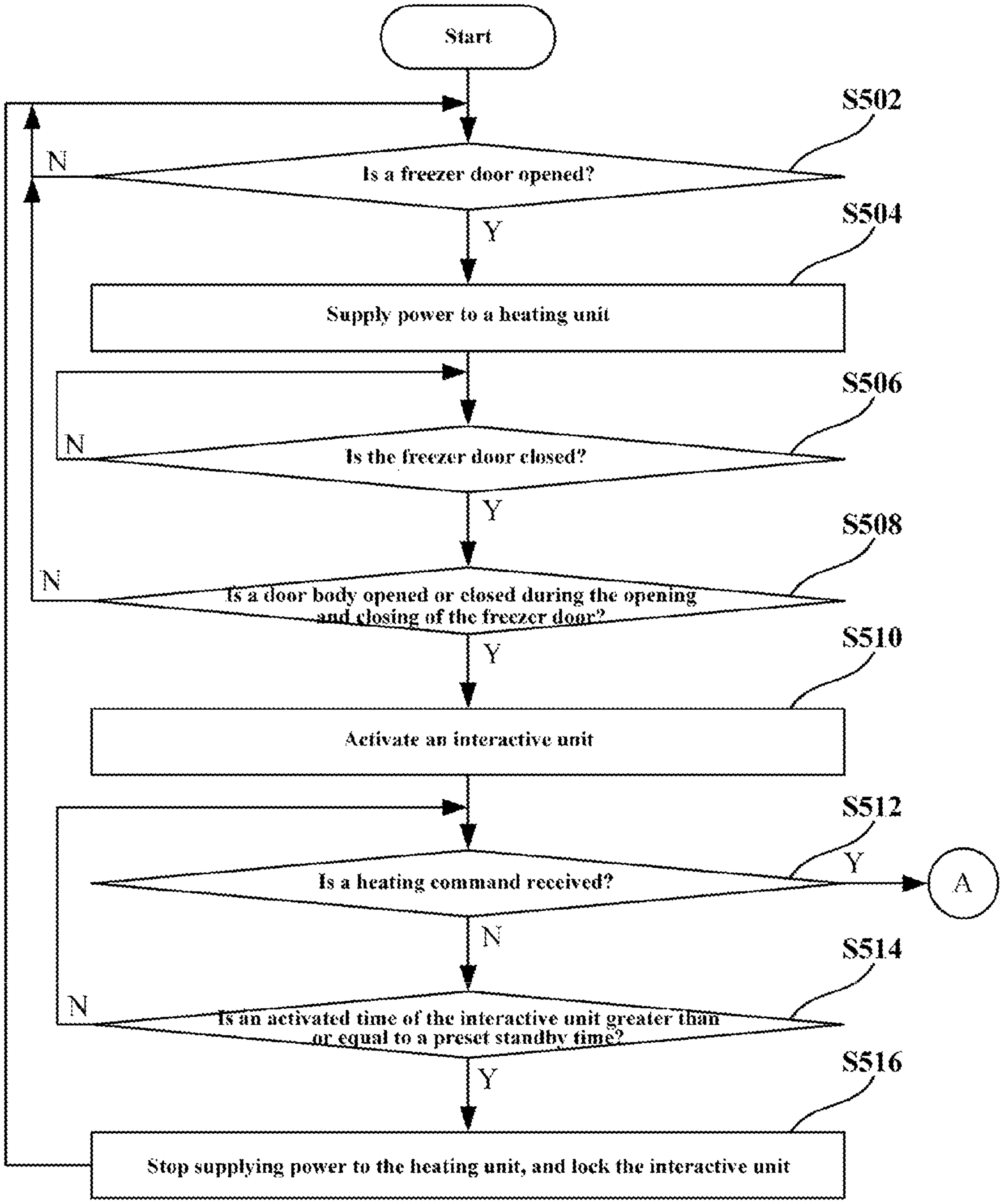
FIG. 5 is a part of a schematic detailed flow diagram of a heating method according to an embodiment of the present invention.
Figure 6:
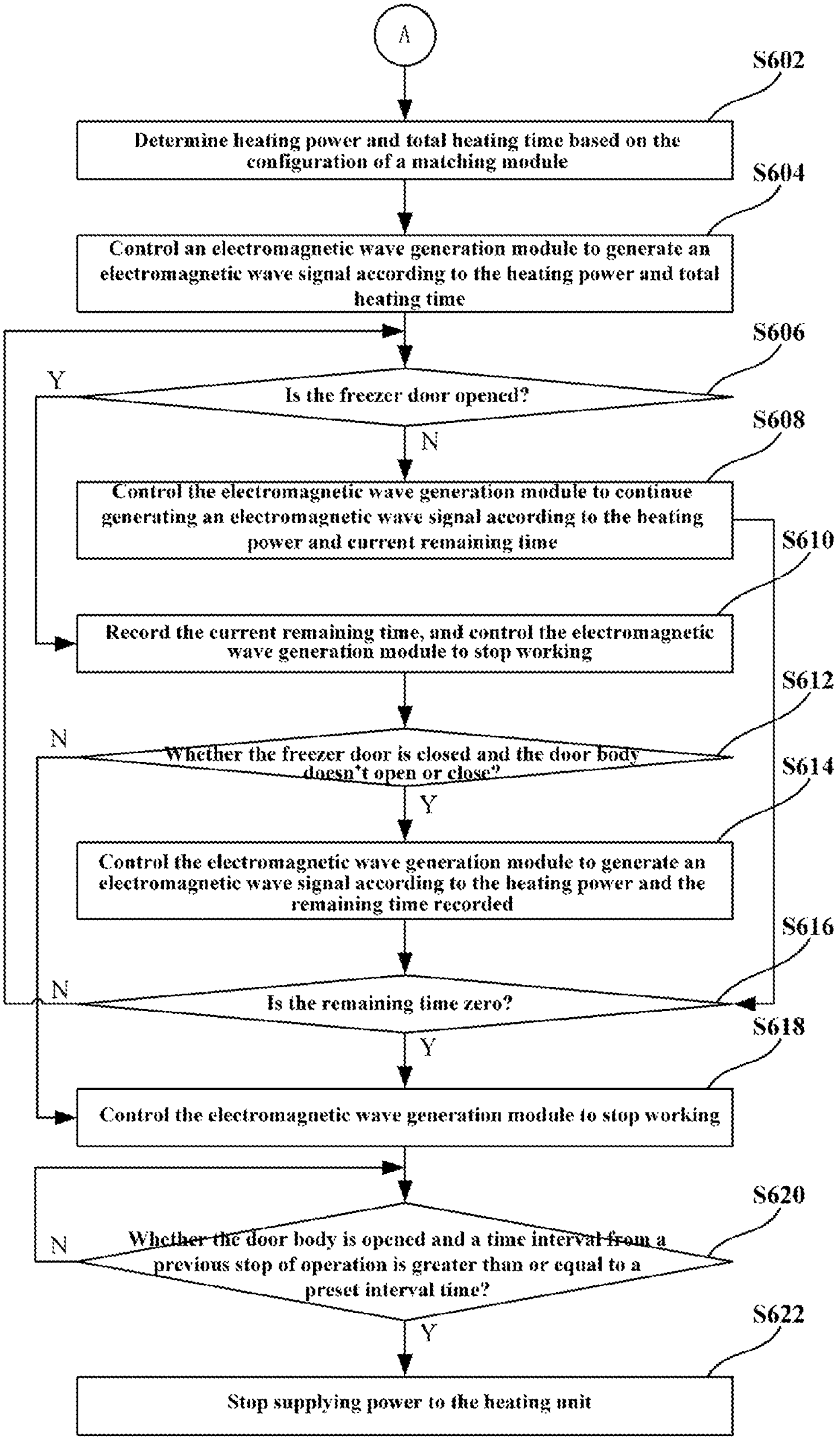
FIG. 6 is another part of a schematic detailed flow diagram of a heating method according to an embodiment of the present invention.

FIG. 5 is a part of a schematic detailed flow diagram of a heating method according to an embodiment of the present invention; and FIG. 6 is another part of a schematic detailed flow diagram of a heating method according to an embodiment of the present invention (where "Y" represents "yes," and "N" represents "no"). In FIG. 5 and FIG. 6, "A" represents a continuation point. Because the method is relatively complicated, and there is difficulty in illustration by a single figure, it is represented in FIG. 5 and FIG. 6, connected by a continuation mark, which can be understood by those skilled in the art. Referring to FIG. 5 and FIG. 6, the heating method provided by the present invention may include following detailed steps:

Step S502: Determining whether a freezer door 222 is opened. If so, proceeding to step S504; and if not, returning to step S502.

Step S504: Supplying power to the heating unit 100.

Step S506: Determining whether the freezer door 222 is closed. If so, proceeding to step S508; and if not, returning to step S506.

Step S508: Determining whether the door body 112 is opened or closed during the opening and closing of the freezer door 222. If so, proceeding to step S510; and if not, returning to step S502.

Step S510: Activating the interactive unit 230.

Step S512: Determining whether a heating command is received. If so, proceeding to step S602; and if not, proceeding to step S514.

Step S514: Determining whether the activated time of the interactive unit 230 is greater than or equal to the preset standby time. If so, proceeding to step S516; and if not, returning to step S512.

Step S516: Stopping supplying power to the heating unit 100, and locking the interactive unit 230.

Step S602: Determining the heating power and total heating time based on the configuration of the matching module 130.

Step S604: Controlling the electromagnetic wave generation module 120 to generate an electromagnetic wave signal according to the heating power and total heating time.

Step S606: Determining whether the freezer door 222 is opened. If so, proceeding to step S610; and if not, proceeding to step S608.

Step 608: Controlling the electromagnetic wave generation module 120 to continue generating an electromagnetic wave signal according to the heating power and current remaining time. Executing step S616.

Step S610: Recording the current remaining time, and controlling the electromagnetic wave generation module 120 to stop working.

Step S612: Determining whether the freezer door 222 is closed and whether the door body 112 does not open or close. If so, proceeding to step S614; and if not, proceeding to step S618.

Step S614: Controlling the electromagnetic wave generation module 120 to generate an electromagnetic wave signal according to the heating power and the remaining time recorded. Executing step S616.

Step S616: Determining whether the remaining time is zero. If so, proceeding to step S618; and if not, returning to step S606.

Step S618: Controlling the electromagnetic wave generation module 120 to stop working.

Step S620: Determining whether the door body 112 is opened and the time interval from the previous stop of operation is greater than or equal to the preset interval time. If so, proceeding to step S622; and if not, returning to step S620.

Step S622: Stopping supplying power to the heating unit 100. Returning to step S502.

Figure 7:
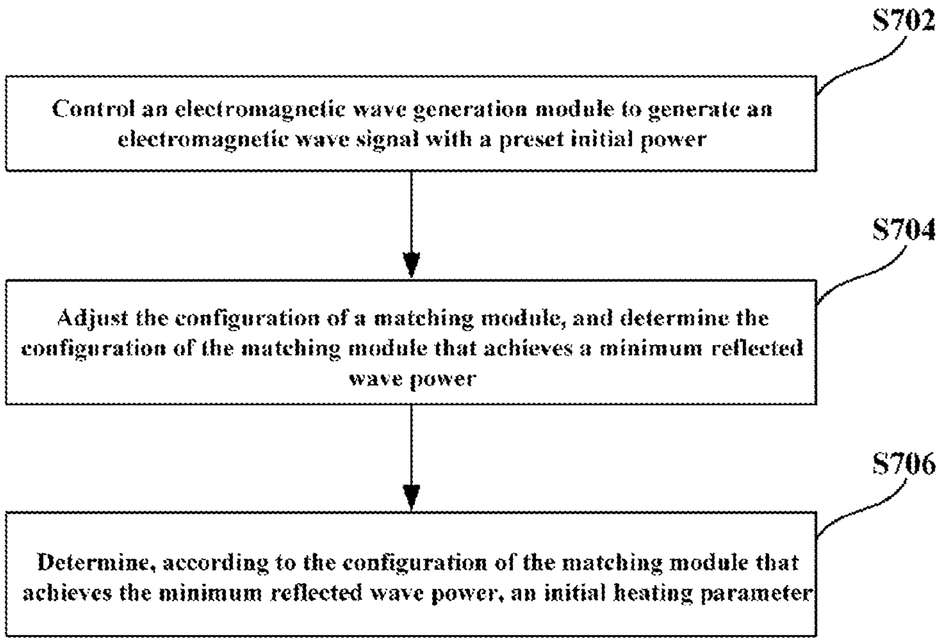
FIG. 7 is a schematic flow chart of determining an initial heating parameter based on the configuration of the impedance matching module.

FIG. 7 is a schematic flow chart of determining an initial heating parameter based on the configuration of the impedance matching module 130. Referring to FIG. 7, determining the initial heating parameter based on the configuration of the impedance matching module 130 may specifically include the following steps:

Step S702: Controlling the electromagnetic wave generation module 120 to generate an electromagnetic wave signal with a preset initial power, where the preset initial power may be 10-20 W, e.g., 10 W, 15 W or 20 W, so as to reduce the impact on the object 150 to be processed and save energy.

Step S704: Adjusting the configuration of the matching module 130, and determining the configuration of the matching module 130 that achieves a minimum reflected wave power, where the reflected wave power can be measured by a directional coupler connected in series between the cavity capacitor 110 and the electromagnetic wave generation module 120.

Step S706: Determining, according to the configuration of the matching module 130 that achieves the minimum reflected wave power, the initial heating parameter.

Figure 8:
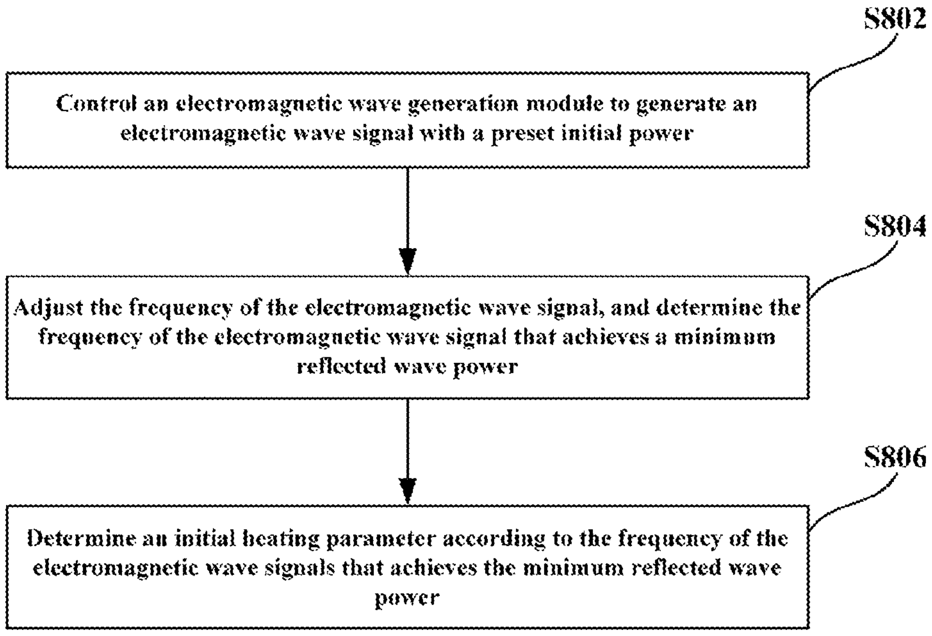
FIG. 8 is a schematic flow chart of determining an initial heating parameter based on the frequency of an electromagnetic wave signal.

FIG. 8 is a schematic flow chart of determining an initial heating parameter based on the frequency of an electromagnetic wave signal. Referring to FIG. 8, determining the initial heating parameter based on the frequency of the electromagnetic wave signal may specifically include the following steps:

Step S802: Controlling the electromagnetic wave generation module 120 to generate an electromagnetic wave signal with a preset initial power, where the preset initial power may be 10-20 W, e.g., 10 W, 15 W or 20 W, so as to reduce the impact on the object 150 to be processed and save energy.

Step S804: Adjusting the frequency of the electromagnetic wave signal, and determining the frequency of the electromagnetic wave signal that achieves the minimum reflected wave power, where the reflected wave power can be measured by a directional coupler connected in series between the cavity capacitor 110 and the electromagnetic wave generation module 120.

Step S806: Determining the initial heating parameter according to the frequency of the electromagnetic wave signal that achieves the minimum reflected wave power.

Thus, those skilled in the art should appreciate that, although a number of exemplary examples of the present invention have been shown and described in detail herein, many other variations or modifications consistent with the principles of the present invention can still be directly determined or deduced according to the contents disclosed in the present invention without departing from the spirit and scope of the present invention. Therefore, the scope of the present invention should be understood and recognized as covering all these other variations or modifications.

What is claimed is:

1. A heating method, comprising:

controlling a heating unit to operate to heat an object to be processed;

if a heating suspension condition is met, recording a current heating parameter of the heating unit, and controlling the heating unit to stop operating; and if a heating continuation condition is met, controlling the heating unit to continue operating according to the recorded heating parameter;

wherein the heating unit is arranged in a storage compartment of a refrigerating and freezing apparatus, wherein the heating suspension condition comprises that a door corresponding to the storage compartment is opened, and wherein a heating continuation condition comprises that the door corresponding to the storage compartment is closed, and a door body of the heating unit does not open or close during the opening and closing of the door.

2. The heating method according to claim 1, wherein the heating unit comprises an electromagnetic wave generation module for generating an electromagnetic wave signal, a cavity capacitor for accommodating the object to be processed, and an impedance matching module connected in series between the electromagnetic wave generation module and the cavity capacitor or in parallel at both ends of the cavity capacitor; prior to the step of controlling the heating unit to operate, the heating method further comprises:

adjusting the configuration of the impedance matching module to reduce a reflected wave power returning to the electromagnetic wave generation module; and determining an initial heating parameter of the heating unit based on the configuration of the impedance matching module, wherein the initial heating parameter comprises at least one of heating power, and a termination threshold for terminating a heating procedure.

3. The heating method according to claim 1, wherein the heating unit comprises an electromagnetic wave generation module for generating an electromagnetic wave signal, and a cavity capacitor which is electrically connected to the electromagnetic wave generation module and used for accommodating the object to be processed; prior to the step of controlling the heating unit to operate, the heating method further comprises:

adjusting the frequency of the electromagnetic wave signal to reduce a reflected wave power returning to the electromagnetic wave generation module; and determining an initial heating parameter of the heating unit based on the frequency of the electromagnetic wave signal, wherein the initial heating parameter comprises at least one of heating power, and a termination threshold for terminating a heating procedure.

4. The heating method according to claim 1, further comprising:

if the door body of the heating unit opens or closes after the heating unit suspends heating, controlling the heating unit to terminate a heating procedure.

5. The heating method according to claim 1, wherein the heating unit is arranged in a storage compartment of a refrigerating and freezing apparatus, and a door of the refrigerating and freezing apparatus is provided with an interactive unit; prior to the step of controlling the heating unit to operate, the heating method further comprises:

if a door body of the heating unit opens or closes during an opening and closing process of the door corresponding to the storage compartment, activating the interactive unit after the door corresponding to the storage compartment is closed, so as to receive a heating command.

6. The heating method according to claim 1, wherein the heating unit is arranged in a storage compartment of a refrigerating and freezing apparatus, and prior to the step of controlling the heating unit to operate, the heating method further comprises:

if a door corresponding to the storage compartment is opened, supplying power to the heating unit; and if no heating instruction is received within a preset standby time from the time when the door corresponding to the storage compartment is closed, stopping supplying power to the heating unit.

7. The heating method according to claim 1, wherein prior to the step of controlling the heating unit to operate, the heating method further comprises:

if a heating completion condition is met, controlling the heating unit to terminate a heating procedure; and if the object to be processed is taken out, receiving another heating command again.

8. The heating method according to claim 7, wherein if a door body of the heating unit is opened, determining that the object to be processed is taken out; and/or after a preset interval time passes since the heating completion condition is met, executing the step of if the object to be processed is taken out, receiving another heating command again.

9. A refrigerating and freezing apparatus, comprising:

a box body, in which at least one storage compartment is defined;

at least one door, configured to open and close the at least one storage compartment;

a heating unit, configured to heat an object to be processed; and a controller, configured to execute the heating method according to claim 1.

10. A heating method, comprising:

controlling a heating unit to operate to heat an object to be processed;

if a heating suspension condition is met, recording a current heating parameter of the heating unit, and controlling the heating unit to stop operating; and if a heating continuation condition is met, controlling the heating unit to continue operating according to the recorded heating parameter;

wherein the heating unit is arranged in a storage compartment of a refrigerating and freezing apparatus, and a door of the refrigerating and freezing apparatus is provided with an interactive unit;

wherein prior to the step of controlling the heating unit to operate, the heating method further comprises:

if a door body of the heating unit opens or closes during an opening and closing process of the door corresponding to the storage compartment, activating the interactive unit after the door corresponding to the storage compartment is closed, so as to receive a heating command.

* * * * *